Figure 3:
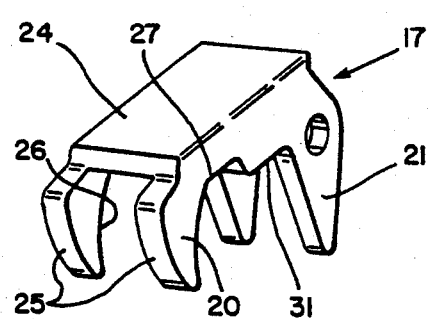

United States Patent [19]

Salice

[11] Patent Number: 4,553,873
[45] Date of Patent: Nov. 19, 1985

[54] CONNECTING FITTING FOR RELEASABLY CONNECTING TWO PLATELIKE FURNITURE MEMBERS

[75] Inventor: Luciano Salice, Carimate, Italy

[73] Assignee: Arturo Salice S.p.A., Novedrate, Italy

[21] Appl. No.: 386,572

[22] Filed: Jun. 9, 1982

[30] Foreign Application Priority Data

Jun. 10, 1981 [DE] Fed. Rep. of Germany ....... 3122978

[51] Int. Cl.$^4$ .............................................. F16B 9/02
[52] U.S. Cl. ................................... 403/245; 403/330; 403/407.1
[58] Field of Search ............... 403/330, 231, 245, 246, 403/407

[56] References Cited

U.S. PATENT DOCUMENTS

| 882,430 | 3/1908 | Sicotte ................................ 403/407 |
| 3,730,568 | 5/1973 | Giovannetti ......................... 403/245 |

FOREIGN PATENT DOCUMENTS

| 2702643 | 12/1979 | Fed. Rep. of Germany . |
| 2642488 | 10/1981 | Fed. Rep. of Germany . |
| 2206684 | 12/1981 | Fed. Rep. of Germany . |
| 3047642 | 10/1982 | Fed. Rep. of Germany . |

Primary Examiner—Andrew V. Kundrat
Attorney, Agent, or Firm—Fleit, Jacobson, Cohn & Price

[57] ABSTRACT

A connecting fitting for releasably connecting two platelike furniture members, which extend preferably at right angles to each other comprises two fitting elements adapted to be secured to respective furniture members to be connected. One of said fitting elements is pin-shaped and provided with an enlarged head and adapted to be slidably inserted into an aperture or recess of the other fitting element until the fitting elements and/or furniture members engage each other. The other fitting element is provided with a spring-loaded locking member, which comprises a forked portion for straddling the first-mentioned fitting element below its head in order to lock the fitting members to each other. In one embodiment of the invention, the locking member consists of a locking lever, which is pivoted to the associated fitting element and has a forked, hook-shaped end portion, which in its locking position straddles the shank of the pin-shaped element behind its head, the hook-shaped end portion has a curved or wedge-like, tapered surface, which extends in the direction in which the head is to be slidably inserted, and means are provided for imparting to the locking lever a pivotal movement to its unlocked position against the force of the spring. In another embodiment of the invention, the locking member consists of a wedge-shaped slider, which is known per se and which on its side facing the supporting face has also a wedge-shaped surface and lies in the direction in which the head is slidably inserted into the housing for the slider, and unlocking means are provided for moving the slider against the spring force to its open position.

22 Claims, 20 Drawing Figures

FIG. 1
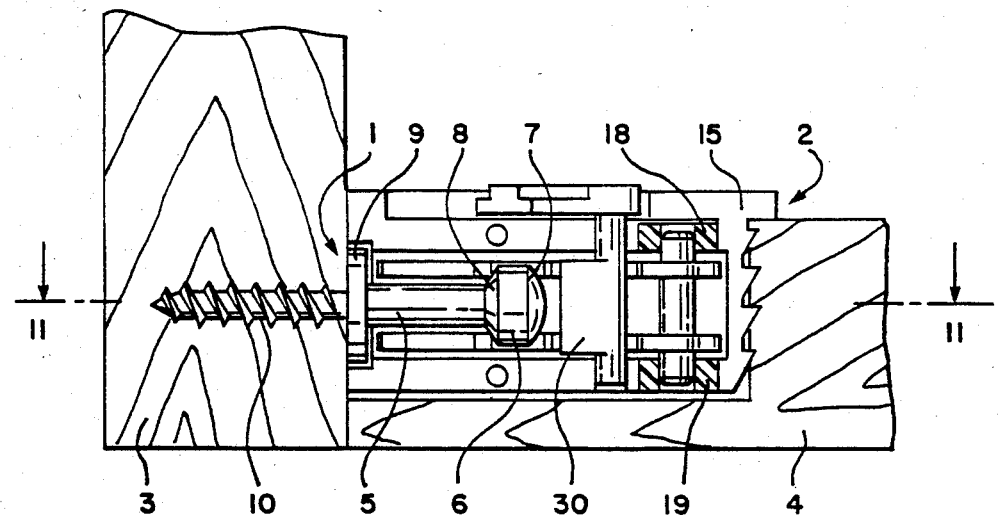
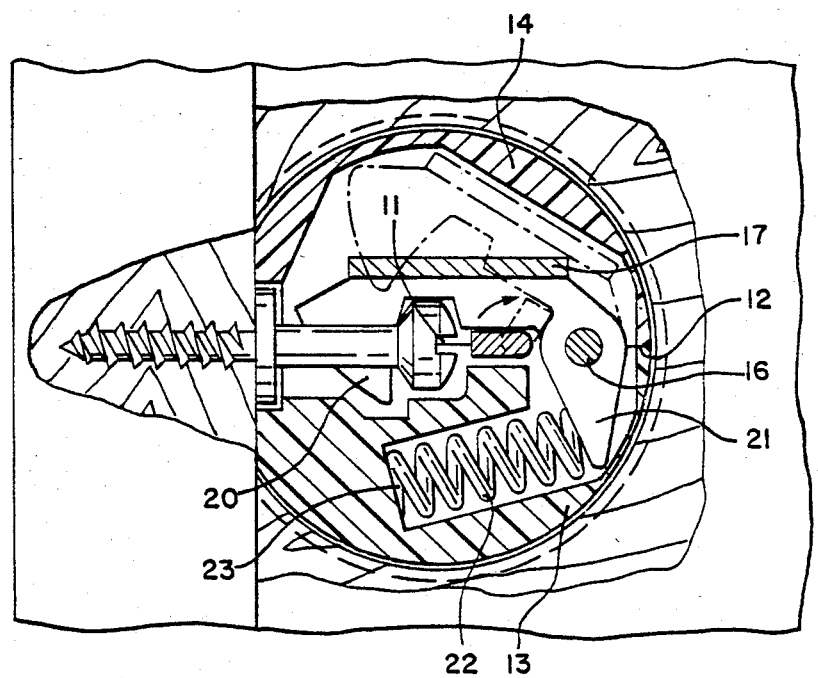
FIG. 2

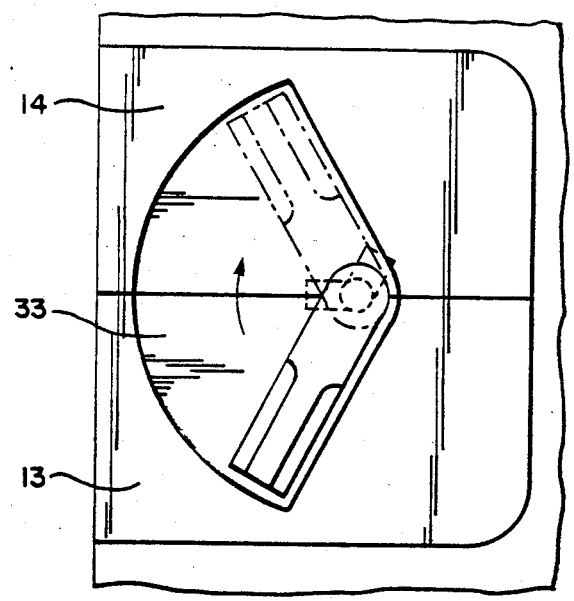
FIG. 6
FIG. 7
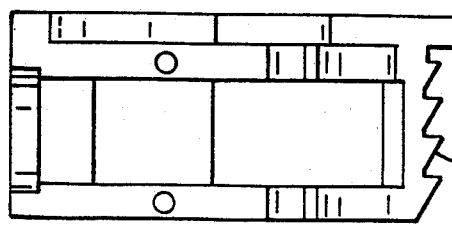
FIG. 8
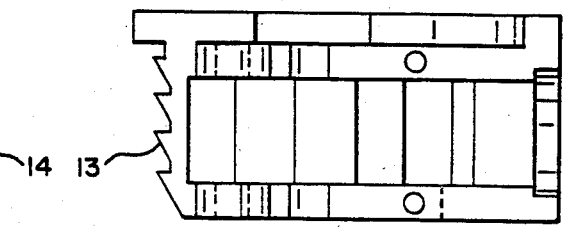
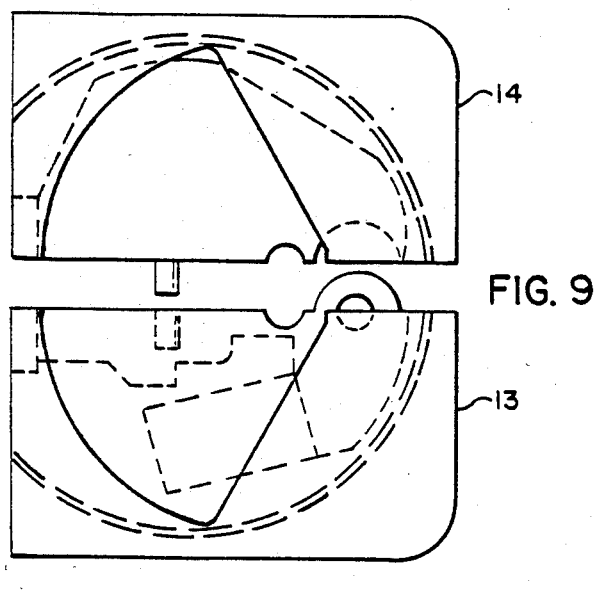
FIG. 9
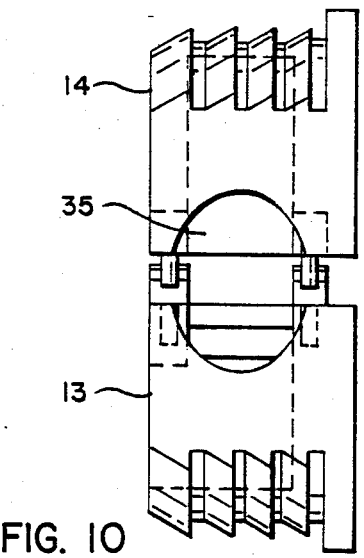
FIG. 10

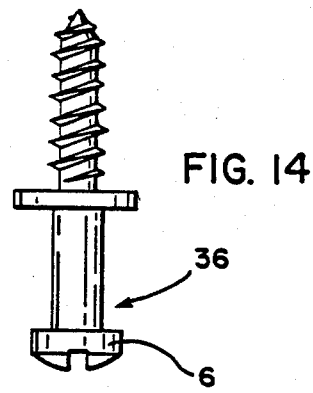
FIG. 14
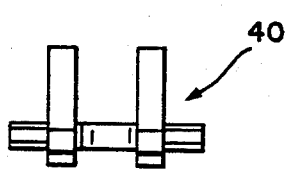
FIG. 15
FIG. 17
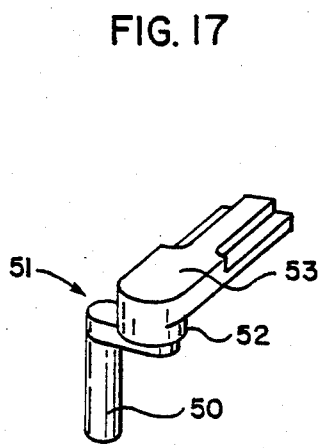
FIG. 16
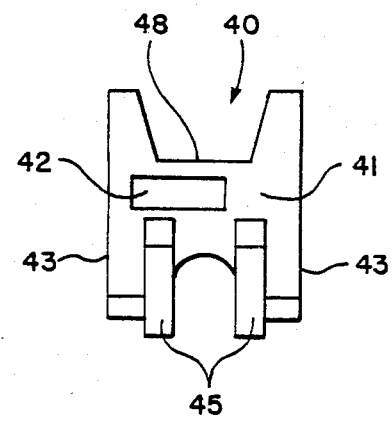

CONNECTING FITTING FOR RELEASABLY CONNECTING TWO PLATELIKE FURNITURE MEMBERS

This invention relates to a connecting fitting for releasably connecting two platelike furniture members, which extend preferably at right angles to each other, comprising two fitting elements adapted to be secured to respective furniture members to be connected, one of which fitting elements is pin-shaped and provided with an enlarged head and adapted to be slidably inserted into an aperture or recess of the other fitting element until the fitting elements and/or furniture members engage each other, and the other fitting element is provided with a spring-loaded locking member, which comprises a forked portion for straddling the first-mentioned fitting element below its head in order to lock the fitting members to each other.

German Patent Publication No. 27 02 643 discloses a connecting fitting in which a pin-shaped fitting element having a head is adapted to be slidably inserted into a groove, which is open at one end and formed in a pot-shaped second fitting element, until the latter snaps behind a step of a resilient tongue to assume its locked position.

German Patent Publication No. 26 42 488 discloses a connecting fitting in which the fitting element having an enlarged head is adapted to be slidably inserted into a wedge-shaped tapering groove, which is formed in the other fitting element between two jaws, which are formed by respective lever arms, which cooperate like pliers and are adapted to be forced against each other by an eccentric screw. These known connecting fittings have the disadvantage that they can be moved to the locked position only by a transverse displacement of the furniture members to be connected and that a tool is required in most cases for tightening so that the assembling is complicated and expensive.

Laid-open German Patent Application No. 22 06 684 discloses a connecting fitting which can be assembled without a tool and comprises a wedge or rotary wedge, which is spring-loaded and to tighten the assembly is forced behind the enlarged head of the pin-shaped second fitting element. Before the pin is inserted, the wedge or rotary wedge assumes a position in which said wedge is pushed back from the receiving opening and is supported by a stop formed by a step of the housing. The wedge or rotary wedge has a web, which in this position lies in the receiving opening and which is engaged by the head of the pin as the latter is inserted so that the wedge or rotary wedge is then pushed away from its stop in order to eliminate the interlock. That known connecting fitting has a complicated structure and has the disadvantage that it can be disassembled only with difficulty if a piece of furniture is to be disassembled. Besides, the wedge or rotary wedge is not safely held in its interlocked position so that the interlock may be inadvertently eliminated with the result that the wedge or rotary wedge springs forward and then may cause injury.

It is an object of the invention so to improve a connecting fitting of the kind described first hereinbefore that the furniture members to be connected by the fitting can easily be assembled and that the fitting elements can easily be separated if the piece of furniture is to be disassembled.

This object is accomplished in accordance with the invention in that the locking member consists of a locking lever, which is pivoted to the associated fitting element and has a forked, hook-shaped end portion, which in its locking position straddles the shank of the pin-shaped element behind its head, the hook-shaped end portion has a curved or wedgelike, tapered surface, which extends in the direction in which the head is to be slidably inserted, and means are provided for imparting to the locking lever a pivotal movement to its unlocked position against the force of the spring.

In the assembling of the connecting fitting according to the invention the locking member need not be moved to a biased, locked position, from which it can be moved by the pin-like fitting element as the latter is slidably inserted. When the fitting element provided with the enlarged head is slidably inserted into the other fitting element in order to assemble the fitting, the head will slide down on the tapered surface of the hook-shaped end portion of the locking lever under the force of the spring until the fitting member having the enlarged head snaps into its locking position behind the hook-shaped end portion. If the connecting fitting is to be taken apart, for instance, because the piece of furniture is to be moved to a different location or is to be altered, it will be sufficient to turn back the locking lever by the unlocking means so that the fitting can be taken apart without difficulty.

According to a preferred further feature of the invention, the rear face of the hook-shaped end portion on the rear side of the head and extends at an acute angle thereto in the locked position, in which the fitting elements and/or the furniture members to be locked to each other engage each other. As a result, there will be no play at all between the two assembled fitting elements in their locked position because the rear of the hook-shaped end portion forces the fitting elements against each other owing to the wedgelike engagement at an acute angle. This self-tightening effect is known in connection with a connecting fitting which is of a different kind and has been described in the prior German Patent Application No. P 30 47 642.7 that has been assigned to the same assignee.

The locking lever is suitably pivoted to a pot-shaped housing on a pivot pin which is parallel to the axial center line of the housing. As a result, the locking lever is entirely surrounded by the housing and no parts of the fitting protrude from the housing.

The means for imparting a pivotal movement to the locking lever suitably consist of a pin, which is pivoted in the housing and comprises a leverlike cam, which engages the locking lever, and the pin carries at its free end a handle lever, which lies on the top wall of the housing. In order to ensure that the unlocking lever remains in the position in which it unlocks the locking lever, the cam may extend in the unlocked position at such an angle to the locking lever that the cam bears on the locking lever in a self-locking manner.

According to another proposal according to the invention, the object set forth is accomplished in that the locking member consists of a spring-loaded slider, which has a side face which in the advanced position of the slider bears on the rear of the head of the pin-shaped element, which has been inserted onto the housing of the slider at right angles to the direction of movement of the latter.

The unlocking means for moving the slider to its open position against the spring force may comprise a crank, which is pivoted to the top wall of the housing and has a crankpin extending into a slot of the slider and is adapted to be pivotally moved by an operating lever lying on the upper surface of the top wall of the housing. In the locking position the crank should be so arranged that the lever which carries the crankpin extends at an angle to the direction of movement of the slider so that the lever cannot block the slider during the slidable insertion of the pin having an enlarged head.

Further desirable features of the invention will be described in the dependent claims.

Figure 4:
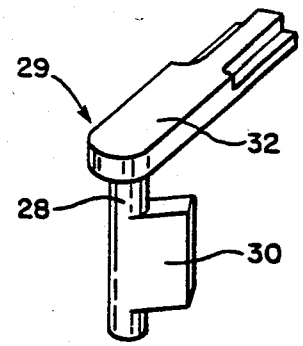
Figure 5:
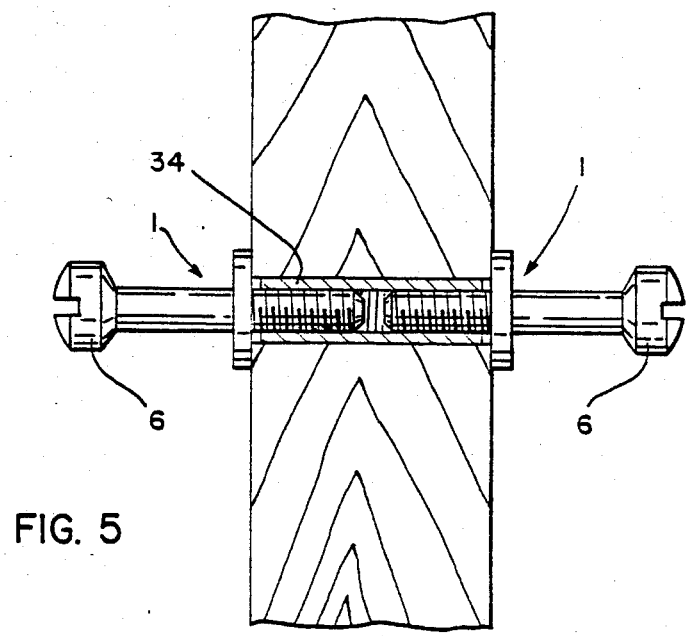
Figure 11:
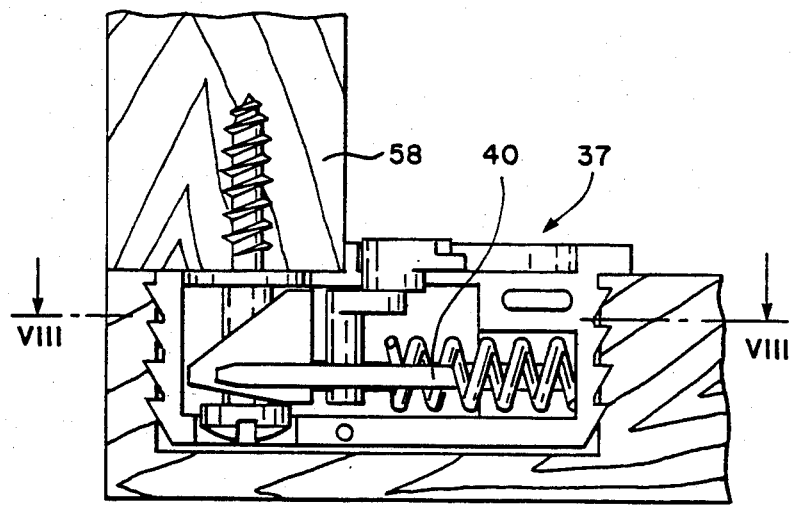
Figure 12:
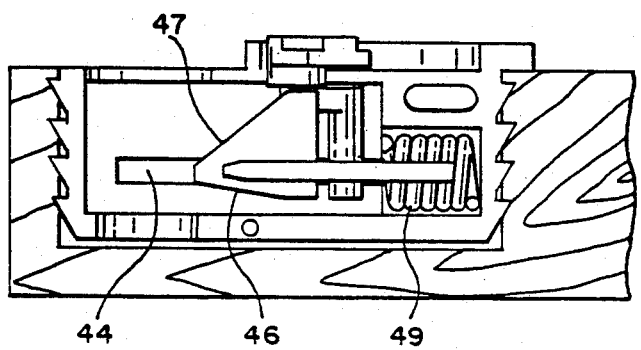
Figure 13:
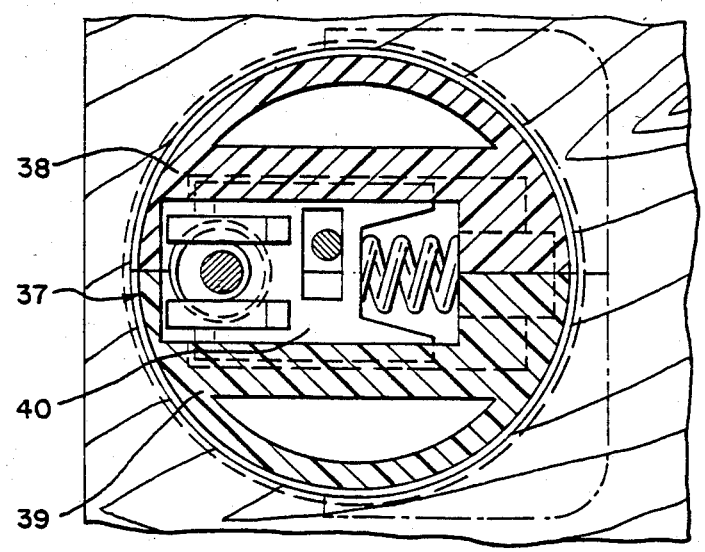
Figure 18:
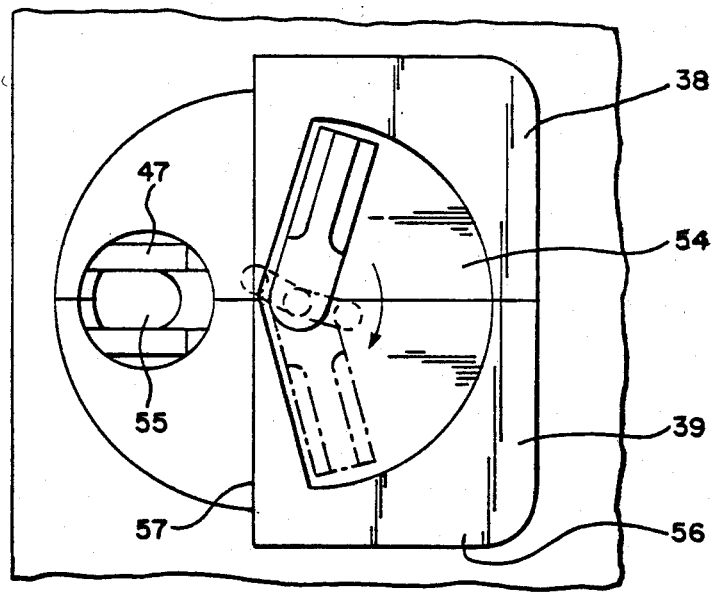
Figure 19:
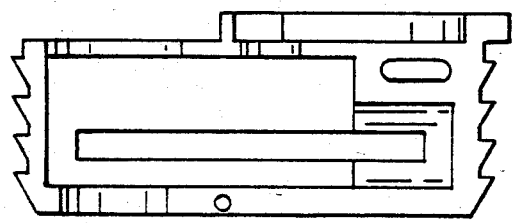
Figure 20:
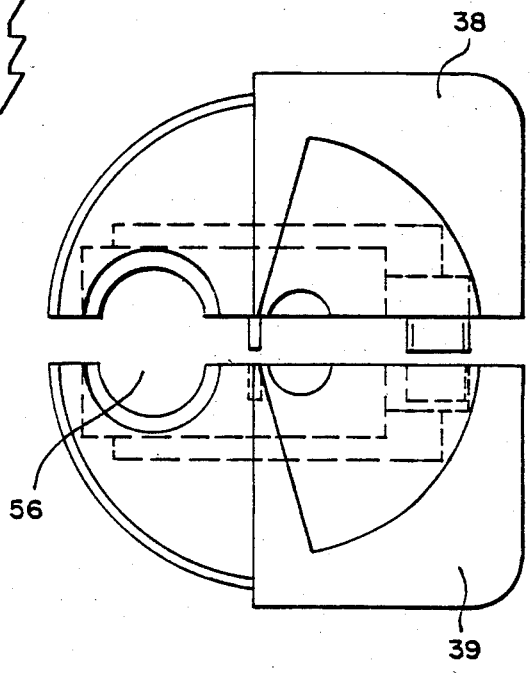

Illustrative embodiments of the invention will now be explained more in detail with reference to the drawings, in which FIG. 1 is a longitudinal sectional view showing a first embodiment of a connecting fitting in locked position, FIG. 2 is a horizontal sectional view taken on line II—II of FIG. 1, FIG. 3 is a perspective view showing the locking lever of the connecting fitting shown in FIGS. 1 and 2, FIG. 4 is a perspective view showing the unlocking lever of the connecting fitting shown in FIGS. 1 and 2, FIG. 5 is a side elevation showing pin-shaped fitting elements which have enlarged heads and have been screwed into a common bushing, FIG. 6 is a top plan view showing the fitting element which is shown in FIGS. 1 and 2 and comprises the locking lever, FIGS. 7 and 8 are side elevations showing the centrally divided housing of the fitting element that is provided with the locking lever, FIG. 9 is a top plan view showing the halves of the housing shortly before they are assembled, FIG. 10 is a front elevation showing the housing halves of FIG. 9, FIG. 11 is a longitudinal sectional view showing a second embodiment of the connecting fitting in locked position, FIG. 12 is a view that is similar to FIG. 11 and shows only the fitting element that is provided with the slider in its unlocked position, FIG. 13 is a horizontal sectional view taken on line VIII—VIII in FIG. 11, FIG. 14 is a side elevation showing the pinlike fitting element which is provided with the enlarged head, FIG. 15 is a front elevation showing the slider, FIG. 16 is a top plan view showing the slider of FIG. 15, FIG. 17 is a perspective view showing the cranklike opening lever, FIG. 18 is a top plan view showing the housing provided with the slider, FIG. 19 is a side elevation showing the centrally divided housing shown in FIG. 18 and FIG. 20 is a top plan view showing the housing parts shortly before they are assembled.

The connecting fitting shown in FIGS. 1 to 10 comprises a fitting element 1, which is screwed into a vertical wall 3 of a piece of furniture, and a housing-like fitting element 2, which is secured in a milled bore of a horizontal wall 4 of the piece of furniture.

The fitting element 1 is pin-shaped and comprises an intermediate shank 5, which at its forward end carries an enlarged head 6. The forward end face 7 of the head 6 has the shape of a segment of a sphere. A frustoconical step 8 is provided at the transition from the head 6 to the shank 5. The rear end of the shank 5 carries a collar 9, which is succeeded by a screw portion 10, which is aligned with the shank 5 and has self-tapping screwthreads.

The head 6 of the fitting element 1 is provided with a slot 11 for a screwdriver.

The fitting element 2 consists of a cylindrical housing, which is divided along its axial center plane 12 into the housing halves 13, 14 and provided at its top with an annular flange 15. The locking lever 17 is pivoted on the pivot pin 16, which is mounted in the housing 13, 14. The pivot pin 16 may be non-rotatably connected to the locking lever 17. The end portions of the pivot pin 16 are held in apertures which are defined by bearing bushings 18,19 formed in the housing.

The locking lever 17 is two-armed. One arm carries a hook-shaped end portion 20. The other arm 21 is loaded by a compression spring 22, which extends to an abutment surface 23 of the housing.

As is apparent from FIG. 3, the locking lever 17 is a channel-shaped sheet metal stamping and has a web 24 and two flanges, the forward portions of which constitute two hook-shaped end portions 20. The forward end faces 25 of the hook-shaped end portions 20 are tapered in the shape of a curve. The rear faces 26 of the hook-shaped end portions 20 are also tapered in the shape of a curve. The rear end portions of the flanges of the channel member constitute the second lever arm 21, which is engaged by the compression spring 22.

In the flanges of the channel member, the toothlike hook-shaped end portions 20 are adjoined by the bottom of recesses 27 which are formed in the flanges of the channel member and in the locked position of the fitting receive the enlarged head 6 of the fitting element 1 but do not bear on the latter.

The pivot 28 of the opening lever 29 is mounted in journals formed in the housing 13, 14 as shown in FIGS. 1, 2, and 9, and extends parallel to the pivot pin 16. The pivot pin 28 has a camlike projection 30, the forward face of which bears on the flat surfaces 31 of the flanges of the locking lever 17. These flat surfaces extend parallel to the web 24 and are connected to the recess 27 by a step.

As is particularly apparent from FIG. 6, the handle portion 32 of the unlocking lever 29 is disposed in a sector-shaped recess 33 formed in the top wall of the housing 13, 14.

In order to permit a connection of horizontal furniture members to both sides of a vertical furniture wall on the same level, fitting elements 1 having enlarged heads 6 are screwed into a bushing 34, which has been slidably fitted into a through bore, as is apparent from FIG. 5. As is apparent from FIGS. 6 to 10, the housing halves 13, 14 are divided along an axial center plane so that the fitting member 2 can easily be mounted. The housing parts 13, 14 are provided with pegs and mating recesses for connecting and centering the housing parts. The housing 13, 14 has a flat forward end face and is provided with an opening 35 for receiving the enlarged head 6.

In the embodiment shown in FIGS. 11 to 20, the fitting element 36, shown in FIG. 14 has basically the same design as the fitting element 1 of the first embodiment.

The fitting element 37, shown in FIG. 11, consists substantially of two housing halves 38, 39, which constitute a housing, and a spring-loaded slider 40, which is slidably guided in the housing. The slider 40 comprises a sliding plate 41, which has two parallel side faces 43, which are slidably guided in tracks 44 along the latter.

These tracks are formed in each of the housing halves 38, 39. Two toothlike locking members 45 are provided on the front face of the sliding plate 41 and extend at right angles to the sliding plate and parallel to each other and are spaced from each other to define a gap between them. The toothlike locking members have a slightly tapered forward face 46 and a more highly tapered rear face 47 and with their slightly tapered forward face bear in their locking position on the rear face of the head 6, as is apparent from FIG. 11. As the head 6 is inserted into the fitting element 37, the head 6 is sliding on the more highly tapered rear face 47.

The slider 41 is formed in its rear face with a recess 48. The compression spring 49 extends between the bottom of the recess 48 and an abutment surface of the housing.

The slider 41 is formed with a transverse slot 42, which constitutes a window 42 and receives the crankpin 50 of the cranklike unlocking lever 51. The latter has a journal 52, which is mounted in the top wall of the housing 38, 39, as is apparent from FIGS. 11 and 12. The cranklike unlocking lever 51 has a handle lever 53, which is disposed in a sector-shaped recess 54 formed in the top wall of the housing.

The housing 38, 39 has a mounting flange 56, which defines a step 57, which constitutes an abutment surface for the furniture member 58 which is to be connected.

As is apparent from FIGS. 19 and 20, the housing halves 38, 39 are provided with pegs and mating recesses for centering and properly connecting the housing halves to each other. In the stepped portion the top wall of the housing has an aperture 55 which is only slightly larger in diameter than the head 6 of the fitting element 36. The tapered faces 47 of the locking member 45 are exposed through that aperture 55 so that when the head 6 of the fitting element 36 is forced inwardly the slider 41 will be forced back against the force of the spring 49 until the locking member 45 snaps in behind the head to its locking position.

What is claimed is:

1. A connecting device for releasably connecting two platelike furniture members extending preferably at right angles to each other, said connecting device comprising two fitting members, one fitting member being pin-shaped having an enlarged head and a shank and adapted to be mounted on one of the platelike furniture members and the other fitting member having a spring-loaded locking member adapted to be pivotally mounted within the other platelike furniture member, said spring loaded locking element including, a forked, hook-shaped end portion for straddling the shank of the pin-shaped member behind its head to lock the fitting members to each other, the forked, hook-shaped end portion having a tapered surface to coact with the head of the pin-shaped member to cam the pin-shaped member into a locked position, the other fitting member further including a locking lever being pivotably movable to move the spring-loaded locking element from the locked position to an unlocked position against the bias of the spring-loaded locking element.

2. A connecting device according to claim 1, wherein the rear face of the forked, hook-shaped end portion bears on the rear side of the head of the pin-shaped member.

3. A connecting device according to claim 2, characterized in that the rear face of the head of the pin-shaped member is in the shape of at least one of a frustum of a cone and a curved cross-section.

4. A connecting device according to claim 3, wherein the rear face of the head of the pin-shaped member bears on a region of the rear face of the forked, hook-shaped portion such that the side edge of the head of the pin-shaped member is spaced from the rear end of the rear face of the hook-shaped portion.

5. A connecting device according to claim 4, wherein the forked, hook-shaped end portion is pivoted on a pivot pin aligned parallel to the axial center line of a housing surrounding the forked, hook-shaped end portion.

6. A connecting device according to claim 5, wherein the locking member is two-armed and a spring acts on that arm opposite to the arm carrying the forked, hook-shaped end portion.

7. A connecting device according to claim 6, wherein the spring is a compression spring held between an abutment surface of the housing and one lever arm.

8. A connecting device according to claim 7, wherein the locking member consists of a channel-shaped sheet metal stamping having a web and flanges comprising toothlike hook-shaped portions.

9. A connecting device according to claim 8, wherein the locking lever includes a pin mounted in the housing, a leverlike cam engaging locking member, and a handle lever secured at a free end of the pin, the handle lever, lying on the top wall of the housing.

10. A connecting device according to claim 9, wherein the cam extends in the unlocked position at an angle to the locking lever such that the cam bears on the locking lever in a self-locking manner.

11. A connecting device according to claim 10, wherein the handle lever extends in a sector-shaped recess of the top wall of the housing.

12. A connecting device according to claim 11, wherein the housing for the locking lever is cylindrical and has a flat forward face and is adapted to be divided along a center plane extending centrally through the flat forward face.

13. A connecting device according to claim 12, wherein an opening, slightly larger in diameter than the head of the pin-shaped member is defined by the flat forward face.

14. A connecting device according to claim 12, wherein one half of the housing defines a downwardly open chamber guiding the compression spring on the sides of the chamber.

15. A connecting device according to claim 14, wherein two pin-shaped elements are each mounted in a bushing adapted to be slidably inserted into a through bore defined by one of the furniture members, and the pinlike elements have screw threads adapted to be screwed into said bushing from opposite ends thereof.

16. A connecting device for releasably connecting two platelike furniture members extending preferably at right angles to each other, said connecting device comprising two fitting members one fitting member being pin-shaped having an enlarged head and a shank and adapted to be mounted on one of the platelike furniture members, and the other fitting member having a compression spring-loaded locking member adapted to be slidably mounted within a housing of the other platelike furniture member, said compression spring-loaded locking member having on a side facing a supporting face, a wedge-shaped surface to cam the pin-shaped member into a locked position, and pivoted unlocking means on the housing for moving the slider against the spring bias to an unlocked position.

17. A connecting device according to claim 16, wherein the portion of the slider having the supporting face is tooth-shaped and is secured to and extends at right angles to a sliding plate slidably mounted in tracks of the housing.

18. A connecting device according to claim 17, wherein two toothlike portions straddle the shank of the pin-shaped element.

19. A connecting according to claim 18, wherein the compression spring biasing the slider is held in a blind hole defined by the housing.

20. A connecting device according to claim 19, wherein the housing of the slider has the shape of a cylindrical disc and the slider is slidably guided in a radial diametrical plane.

21. A connecting device according to claim 20, wherein the unlocking means comprises a crank pivoted in the top wall of the housing, a crankpin extending into a slot defined by the slider, and said crank being pivotally movable by means of a handle lever disposed on the upper surface of the top wall of the housing.

22. A connecting device according to claim 21, wherein the actuating lever is positioned in a sector-shaped recess defined by the top wall of the housing.

* * * * *